United States Patent Office 3,658,935
Patented Apr. 25, 1972

3,658,935
DIMERIZATION AND CODIMERIZATION PROCESS
Lloyd A. Pine, Baton Rouge, La., assignor to Esso Research and Engineering Company, Linden, N.J.
No Drawing. Continuation-in-part of application Ser. No. 683,447, Nov. 16, 1967. This application June 8, 1970, Ser. No. 44,610
Int. Cl. C07c 3/20
U.S. Cl. 260—683.15 R     3 Claims

ABSTRACT OF THE DISCLOSURE

The dimerization or codimerization of monoolefins, especially propylene and n-butylene or mixtures thereof in the presence of nickel oxide catalysts has been found to produce high yields of predominantly straight chain or singly branched $C_6$, $C_7$ and $C_8$ olefins which are especially suitable as feedstocks for oxonation to lightly branched alcohols that are subsequently used in the formation of plasticizers of superior quality. The improvement in these well-known dimerization or codimerization reactions resides in the introduction of critical amounts of hydrogen to the dimerization or codimerization reactor in order to enhance the catalyst activity and to suppress catalyst poisoning by impurities in the feedstream which are mainly acetylenes and diolefins, especially 1,3-butadiene. The introduction of a specified amount of hydrogen ranging from 1 to 10 moles of hydrogen per mole of butadiene impurity has greatly extended the life of the catalyst.

This application is a continuation-in-part of U.S. Ser. No. 683,447, filed Nov. 16, 1967 and now abandoned.

This invention relates to the dimerization or codimerization of monoolefins, especially propylene, n-butylene, or mixtures thereof in the presence of nickel oxide catalyst whereupon lightly branched or straight chain $C_6$, $C_7$ and $C_8$ olefins are produced. In one aspect, this invention relates to the introduction of hydrogen directly to the reaction mixture in order to improve the catalyst activity maintenance.

In another aspect, this invention relates to the employment of feedstocks containing acetylenes and diolefins at concentration levels that would normally poison the nickel oxide catalyst were it not for the introduction of the hydrogen to suppress such catalyst poisoning.

The prior art contains many patents which relate to the dimerization and codimerization of propylene, n-butylene or mixtures thereof to produce $C_6$, $C_7$ and $C_8$ olefins. For example, in application Ser. No. 661,225, filed Aug. 17, 1967 and now abandoned, there is disclosed a new, improved process for the codimerization of propylene and n-butylene at low temperatures in liquid phase to yield predominantly straight chain or singly branched $C_6$, $C_7$ and $C_8$ olefins. The reaction is kinetically controlled and the reaction product mixtures are rich in heptenes containing relatively small amounts of olefins greater than $C_8$ and the products of the reaction are straight chained or lightly branched $C_6$, $C_7$ and $C_8$ olefins.

While this process has proven highly satisfactory, it has nonetheless been found that the life of the catalyst is greatly shortened when impure feed streams containing acetylenes or diolefins, especially 1,3-butadiene, are used. Commercially desirable feed streams contain acetylenes or diolefins, or both, as impurities because these streams result from cracking operations, for example, steam and catalytic cracking. Such streams contain considerable amounts of diolefins, generally up to about 2% diolefins; usually 1,3-butadiene and can contain up to about 5 or 6% diolefins. The acetylenes and diolefins are physically adsorbed by the catalyst and as the reaction proceeds the activity of the nickel oxide catalyst is greatly decreased. Eventually, catalyst activity becomes so low that the operation must be shut down and the undesirability of this interruption is quite clear, despite the obvious commercial advantages of using an impure stream obtained from a catalytic cracker.

U.S. Pat. No. 2,837,587, issued to J. P. Hogan et al., describes a method for purifying olefin-rich feeds prior to the employment of these feeds in a polymerization reaction. Hogan describes feed poison tests in Table II of his patent conducted over a nickel oxide catalyst and employing 55% of hydrogen in the ethylene feed in order to remove the catalyst poisons. However, Hogan does not add his hydrogen directly to the polymerization zone, but rather employs a two-step process, the first step being the selective hydrogenation reaction. In other words, this high amount of hydrogen employed would also deactivate the nickel oxide catalyst. It is not suggested by Hogan that one could obtain, by the mere addition of a small amount of hydrogen, any desirable effect for maintaining the polymerization activity of the nickel oxide catalyst since Hogan employed in his feed a 55% mixture of hydrogen and still suffered deactivation. My invention differs from Hogan in that I employ appreciably less amounts of hydrogen and I also add the hydrogen directly to the dimerization zone, thereby eliminating the need for a two-step process. U.S. Pat. No. 2,706,211, issued to Clark describes a hydrocarbon polymerization and hydrogenation process which is catalyzed by nickel oxide. Clark employs the basic purification system of Hogan; however, he is using the nickel oxide catalyst for different purposes and during different stages of its deactivation than Hogan was employing the nickel oxide catalyst. Clark adds a large quantity of hydrogen directly to the polymerization reaction, not to operate as a selective hydrogenation of dienes to monoolefins, but to hydrogenate olefins to paraffins. However, Clark clearly states in column 3, line 55, of his patent that his nickel oxide catalyst does, in fact, lose its polymerization activity when exposed to hydrogen in the feed. This teaching of Clark is absolutely contrary to what is claimed as my invention and it is not believed that this reference can anticipate the teaching of my invention, which is to maintain the nickel oxide catalyst activity by adding a specified amount of hydrogen to the dimerization zone.

U.S. Pat. No. 3,075,917, issued to Kronig et al. relates to a polymerization reaction using a mixture of nickel and thorium oxide as the catalyst system. Kronig is interested in the selective hydrogenation of dienes and acetylenes and does not specifically teach the criticality of adding a small amount of hydrogen directly to a dimerization zone so as to prolong the activity of a nickel oxide catalyst itself. Kronig does not teach the advantage of adding a prescribed amount of hydrogen directly to a feed mixture containing an impurity such as butadiene during the dimerization or codimerization of monoolefins such as propylene or n-butylene.

U.S. Pat. No. 2,507,864, issued to Frank J. Moore et al. relates to catalytic polymerization of olefins. This patent contemplates a method of polymerizing olefinic hydrocarbons which comprises passing the hydrocarbons in contact with a solid catalyst comprising an acid treated zeolite type of synthetic gel having the approximate composition $Na_2O \cdot Al_2O_3 \cdot 5SiO_2$ (before acid treatment). Moore states that his catalyst contains a small amount of metal oxide, preferably nickel oxide, and that the amount of nickel oxide may amount from 1 to 10%, preferably about 1 to 2%, by weight of the acid treated gel. This catalyst system differs from the catalyst system of the subject invention in that Moore employs a molecular sieve base catalyst and conducts a vapor phase operation as contrasted to the amorphous phase catalyst and liquid phase operation employed in the codimerization of propylene or n-butylene. Moore employs from 300 to 320 cubic feet per barrel of liquefied charge of hydrogen to the reaction mixture. This corresponds to about 43 mole percent on propylene or 21 mole percent on total feed. This amount of hydrogen raised the yield of dimer in the Moore process, but it did so by raising conversion while selectivity to the dimer was lowered. In my process, both the conversion and selectivity to dimer are enhanced by the hydrogen addition, which is achieved by adding a specified amount of hydrogen to the dimerization reaction which is substantially less than that employed by Moore. Moore makes no statements as to the effect of hydrogen addition upon his catalyst activity maintenance.

Therefore, it is an object of this invention to remove the disadvantages associated with the employment of impure feed streams as a charge stock in a dimerization or codimerization reaction;

It is another object of this invention to provide a process which employs feedstocks containing acetylenes or diolefins, or both, at levels that normally poison the catalyst;

It is another object of this invention to improve the activity maintenance of a nickel oxide catalyst used in the dimerization or codimerization of propylene, n-butylene or mixtures thereof;

Other objects and many of the attendant advantages of this invention will be readily appreciated as the same becomes better understood by reference to the following detailed description.

Briefly, this invention relates to a process for dimerizing or codimerizing an impure feed mixture containing n-butylene, propylene or mixtures thereof, said feed being contaminated with an impurity, said impurity being one selected from the group consisting of acetylenes, diolefins or mixtures thereof, said contaminated feed being contacted with a supported nickel oxide catalyst at dimerizing conditions, improvement therewith comprising the step of adding from 1 to 10 moles of hydrogen per mole of said impurity to the feed during the dimerization thereof whereby both the activity of the nickel oxide catalyst is maintained and the product distribution to branched or slightly branched $C_6$, $C_7$ and $C_8$ olefins is greatly enhanced.

It has surprisingly been discovered that the addition of small amounts of hydrogen, namely from about 1 mole to about 10 moles of hydrogen per mole of impurity located in a catalytically cracked feed to the reaction mixture suppresses the normal tendency of the acetylene or diolefin impurities to poison the catalyst. In addition, the rate of conversion and selectivity of the catalyst to form the desirable dimers is greatly enhanced. The mechanism of this reaction is not clearly known, but it has been ascertained that the impurities are not adsorbed onto the surface of the catalyst when this amount of hydrogen is present. Contrary, the catalyst itself is not deactivated by the presence of this limited amount of hydrogen which was found to be very surprising.

In the particularly preferred propylene-n-butene codimerization reaction, the operating variables are most important in order to obtain slightly branched or straight chained dimers of $C_6$, $C_7$ and $C_8$ carbon atoms. The reaction, particularly the codimerization of propylene and normal butene, is conducted at pressures sufficient to maintain a liquid phase and at temperatures ranging from 140° F. to 300° F., and preferably from 175° F. to 250° F. The pressures employed range from about 150 pounds per square inch to about 1,000 pounds per square inch, and preferably from about 200 pounds per square inch to about 500 pounds per square inch. The molar ratio of $C_4$ to $C_3$ olefins in the feed is an important operating variable and greatly influnces the selectivity of the reaction system to produce the heptenes, especially lightly branched $C_6$, $C_7$ and $C_8$ olefins generally. Under the normal conditions of operation, the molar ratio $C_4$ to $C_3$ olefins ranges from about 1:1 to about 5:1, and preferably from about 2:1 to about 3.5:1.

The preferred catalyst is nickel oxide supported on silica gel or other such suitable carrier. The nickel oxide can exist as nickel oxide, nickel dioxide, nickel sesquioxide, nickel peroxide, or mixtures of these and other oxides. In most instances, nickel oxide is predominant in the mixtures. The silica gel can be used alone or with a catalyst promoter, and can be prepared by any of several known methods. Suitably, the carrier is impregnated with from about 0.1% to about 35%, or preferably from about 15% to about 30%, by weight of nickel oxide or mixtures of oxides based on the total weight of the resultant catalyst. An amorphous silica-alumina gel containing from 10% to about 45%, and preferably from about 15% to about 25%, of aluminum based on the total weight of the support is found to be a highly effective support. The nickel oxide-silica-alumina catalyst and its preparation are described in U.S. Pat. No. 2,581,228.

Reaction rate is found to be a function of catalyst concentration and for practical reasons from about 1% to about 100%, and preferably from about 2% to about 50%, by weight of the catalyst based on the total weight of the reactions is employed in the reaction mixtures.

The invention will be better understood by reference to the following examples which present selected data. These data bring out the more salient features of the new and improved process.

Each of the runs in the examples immediately following were made in a continuous operation. A small continuous 10 cubic centimeter reactor unit was heated by immersion in a fluidized sandbath. Dry nickel oxide catalyst supported on silica alumina gel was charged thereto prior to initiation of the reaction.

Charges to the reactor were prepared in an adjacent feed accumulator, i.e., a pot containing feed input and output means and also a circulatory loop for recycling the contents of the pot. For convenience, a high purity monoolefin feed was selected, this feed containing an accurately measured amount of an impurity. The contents of the accumulator were continuously circulated through a 3A molecular sieve drier to remove moisture. Hydrogen was added to the accumulator in concentration sufficient to saturate the circulating monoolefin feed stream, which was maintained at substantially ambient temperatures, and elevated pressures equal to that employed in the reactor.

Feed from the accumulator was flowed downwardly through the fixed bed reactor, flow from the bottom of the reactor being partially restricted by a regulator to provide the desired reactor pressure. The charge to the reactor was maintained at 2.4 volumes of feed per volume of catalyst per hour, while the reactor was maintained at a temperature of 212° F. and at pressures of 500 or 800 pounds per square inch gauge, as given. The withdrawn product, both liquid and vapor, was analyzed to determine the product distribution. There was no evidence of olefins being reduced to paraffins by the hydrogen.

EXAMPLES 1–4

In a first series of runs (Table I), an enhancement of the catalyst is shown by addition of hydrogen. There is a positive benefit in that the catalytic quality of the catalyst is improved. Butene-1, containing a measured amount of 1,3-butadiene impurity, was thus saturated with hydrogen and dimerized in the presence of a supported nickel oxide catalyst. Analysis was made of the product withdrawn at the end of two days, and subsequent analyses were made at one-day (or twenty-four hour) intervals. The results are tabulated in Table I below as Runs 1 through 4, respectively. These results are to be compared with a demonstration Run "0" similar in all respects to Run 1 except that no hydrogen was added to the feed.

TABLE I.—NiO/Si-Al Gel Catalyst

[500 p.s.i.g., 2.4 v./v./hr., 212° F.]

| Run No | 0 | 1 | 2 | 3 | 4 |
|---|---|---|---|---|---|
| Hydrogen present | None | Yes | Yes | Yes | Yes |
| 1,3-butadiene in feed, wt. percent | 0.05 | 0.05 | 0.05 | 0.05 | 0.05 |
| Butene-1 conversion, wt. percent | 4.18 | 46.5 | 47.1 | 52.5 | 51.7 |
| Product distribution: | | | | | |
| Dimer | 76.8 | 84.4 | 86.2 | 83.9 | 85.8 |
| Trimer | 20.3 | 15.6 | 13.8 | 16.1 | 14.2 |
| Tetramer | 2.9 | 0 | 0 | 0 | 0 |

It is thus shown that the presence of the hydrogen prevents catalyst deterioration. Hydrogen even improves catalyst activity, as well as product distribution. Thus, by comparison of Run 0 and Run 1, which are analyses taken at the end of two-day intervals from initiation of the reactions, it is seen that the butene conversion is considerably higher when using hydrogen. Moreover, the rate of conversion actually improves with continued exposure of the catalyst to hydrogen. In addition, the product distribution is drastically improved by the hydrogen addition.

The beneficial use of hydrogen is fully realized when considering that the rate of catalyst poisoning is directly related, in this instance, to diolefin concentration. It has been shown, e.g., that where one percent 1,3-butadiene is present in the feed, at these conditions, catalytic activity will virtually completely cease within a twenty-four hour period.

There results, then, an actual deterioration of the catalyst where hydrogen is not used. This is further demonstrated in Table II which gives runs similar to the above except that the butene-1 stream contains an even greater concentration of the impurity. Analyses are made at the end of one-day intervals from the time an analysis is made on Run 5.

TABLE II.—NiO/Si-Al Gel Catalyst

[500 p.s.i.g., 2.4 v./v./hr., 212° F.]

| Run No | 5 | 6 | 7 |
|---|---|---|---|
| Hydrogen present | None | None | None |
| 1,3-butadiene in feed, wt. percent | 0.34 | 0.34 | 0.34 |
| Butene-1 conversion | 37.5 | 28.4 | 26.4 |

It is apparent by comparison of the data obtained in Runs 5 through 7 that the catalyst is deteriorating, and at a fairly rapid rate.

EXAMPLES 5–8

In sharp contrast, however, when hydrogen is cut into the reaction mixture after the analysis made in Run 7 (rewritten below), the following results (Table III) are obtained:

TABLE III.—NiO/Si-Al Gel Catalyst

[500 p.s.i.g., 2.4 v./v./hr., 212° F.]

| Run No | 7 | 8 | 9 | 10 | 11 |
|---|---|---|---|---|---|
| Butadiene in feed, wt. percent | 0.34 | 0.34 | 0.34 | 0.34 | 0.34 |
| Moles of $H_2$/mole of butadiene | 0 | 8.8 | 8.8 | 8.8 | 8.8 |
| Butene-1 conversion | 26.4 | 42.3 | 45.3 | 48.7 | 51.4 |

The rate of conversion improves after hydrogen is cut in. It is thus apparent that the use of hydrogen provides outstanding advantages.

EXAMPLES 9–11

As has been stated, the greater the diolefin concentration in the feed, the more rapid the deterioration of the catalysts. For example, it has been found that catalyst activity virtually ceases in less than two days where a feedstream contains as much as 0.7 percent 1,3-butadiene; and in less than two hours where a feedstream contains as much as 1.8 percent 1,3-butadiene. The following data utilize such concentrations. The data given in Table IV show the benefits of adding hydrogen to a process to which was fed a feedstream containing 0.72 weight percent 1,3-butadiene concentration. The analyses were taken at the end of twenty-four hour intervals.

TABLE IV.—NiO/Si-Al Gel Catalyst

[500 p.s.i.g., 2.4 v./v./hr., 212° F.]

| Run No | 12 | 13 | 14 |
|---|---|---|---|
| Butadiene in feed, wt. percent | 0.72 | 0.72 | 0.72 |
| Moles of $H_2$/mole diene | 4.2 | 4.2 | 4.2 |
| Butene-1 conversion | 51.0 | 52.3 | 52.6 |

The data of the above table thus show that at the end of three days, the activity of the catalyst had not deteriorated but had, in fact, been improved.

EXAMPLES 12–15

The following Table V shows benefits when the concentration was increased to 1.8 percent in the feed. Analyses were taken at the end of twenty-four hour intervals over a four-day period. The pressure of the reaction in this instance was maintained at 800 pounds per square inch gauge.

TABLE V.—NiO/Si-Al Gel Catalyst

[800 p.s.i.g., 2.4 v./v./hr., 212° F.]

| Run No | 15 | 16 | 17 | 18 |
|---|---|---|---|---|
| Butadiene in feed, wt. percent | 1.8 | 1.8 | 1.8 | 1.8 |
| Moles of $H_2$/mole butadiene | 2.5 | 2.5 | 2.5 | 2.5 |
| Butene-1 conversion | 23.8 | 26.6 | 29.9 | 36.6 |

From the above data it is apparent that the addition of hydrogen has the effect of regenerating the catalyst as the reaction proceeds.

EXAMPLES 16–17

In additional runs, propylene and butene-1 are admixed within the accumulator and thence codimerized in the reactor under generally similar conditions, as in the foregoing examples. In certain demonstrations no hydrogen is added, and these runs are compared with runs wherein hydrogen is added, as shown by Table VI, below:

TABLE VI.—NiO/Si-Al Gel Catalyst

[500 p.s.i.g., 2.4 v./v./hr., 212° F.]

| Run No | 19 | 20 | 21 | 22 | 23 |
|---|---|---|---|---|---|
| Butadiene in feed, wt. percent | 0.02 | 0.02 | 0.74 | 0.74 | 0.74 |
| Hydrogen | No | No | No | Yes | Yes |
| $C_4/C_3$ feed ratio | 2.11 | 2.11 | 2.11 | 2.11 | 2.11 |
| Conversion to $C_6^+$ | 41.8 | 41.0 | 25.6 | 39.3 | 45.6 |

EXAMPLE 18

A small continuous unit was started up with a fresh catalyst comprising Nio/SO/Al gel and employing nominally pure butene-1 as feed. The rate of introduction of the feed was 2.4 v./v./hr. and the reaction was conducted at a temperature of 212° F. and at a pressure sufficient to maintain the reaction in the liquid phase. At the start there was 50% conversion of butene-1. The butadiene content of this feed was then raised to 0.34 weight percent of butadiene per weight of the total feed and at this level the catalyst was slowly poisoned and conversion dropped daily until the conversion rate was approximately 21%. At this point, hydrogen was added in an amount to saturate the feed at 500 pounds per square inch gauge and the conversion jumped from 26.4 to 42.3% within twenty-four hours and continued to rise until it was slightly higher than it had been with pure feed and fresh catalyst. At this point the butadiene concentration in the feed was increased to 0.72 weight percent by weight of the total feed and the addition of hydrogen permitted the catalyst activity to be maintained although in previous work this level of butadiene had caused complete catalyst deactivation. When the butadiene level was raised to 1.8 weight percent by weight of the total feed, and the catalyst lost activity reducing the version down to approximately 22%. However, the activity was again restored when the hydrogen concentration was increased by saturating at 800 pounds per square inch gauge. Without hydrogen persent, the catalyst would have been dead in about two hours. The run was terminated at this point and the catalyst discharged. The discharged catalyst does not contain metallic nickel so it is not reduced by this presence of hydrogen.

In summary, these examples demonstrate the fact that if a specified range of hydrogen is added directly to the dimerization reactor, that the catalyst activity is maintained over a prolonged period of time and the selectivity to $C_6$, $C_7$ and $C_8$ olefins to produce either straight or slightly branched $C_6$, $C_7$ and $C_8$ olefins from the dimerization of propylene or n-butylene or mixtures thereof is greatly enhanced.

What is claimed is:

1. In a process for dimerizing or codimerizing a feed containing propylene, n-butene or mixtures thereof, wherein said feed is contaminated with an impurity, said impurity being one selected from the group consisting of acetylenes, diolefins and mixtures thereof wherein the contaminated feed is contacted with a nickel oxide catalyst supported upon a silica-alumina support at a temperature ranging from 140° F. to 300° F. and a pressure ranging from 150 pounds per square inch to 1,000 pounds per square inch, said nickel oxide catalyst containing from 0.1 to 35% nickel based on the weight of the total catalyst and a silica-alumina gel containing from 10% to 45% alumina based on the total weight of said silica-alumina gel, the improvement therewith comprising the step of adding from 1 to 10 moles of hydrogen per mole of said diene or acetylene impurity to the feed during the dimerization or codimerization thereof whereby catalyst activity is maintained and selectivity to the $C_6$, $C_7$ and $C_8$ straight or slightly branched olefins is enhanced.

2. The process according to claim 1 wherein the impurity is 1,3-butadiene.

3. In a codimerization process for producing predominantly straight or slightly branched $C_6$ through $C_8$ olefins by codimerization of propylene with n-butylene contained in a feed mixture contaminated with an impurity, said impurity being one selected from the group consisting of acetylenes, diolefins and mixtures thereof wherein said feed mixture is contacted with a nickel oxide catalyst supported upon a silica-alumina support, the amount of nickel ranging from 0.1 to 35% by weight of the total weight of the supported catalyst and the amount of alumina ranging from 10 to 45% by weight of the support at temperatures ranging from 140° F. to 300° F. and pressures sufficient to provide liquid phase reaction and at a mole ratio of $C_4$ to $C_3$ ranging from 1:1 to 5:1 within the feed mixture, the improvement therewith comprising the step of adding from 2 to 5 moles of hydrogen per mole of said diolefin to the feed during the dimerization thereof whereby the catalyst activity is maintained and the product distribution to form slightly branched $C_7$ olefins is greatly enhanced.

References Cited

UNITED STATES PATENTS

| 2,507,864 | 5/1950 | Moore et al. | 260—683.15 |
| 2,706,211 | 4/1955 | Clark | 260—683.15 |
| 2,837,587 | 6/1958 | Hogan et al. | 260—683.15 |
| 3,075,917 | 1/1963 | Kronig et al. | 260—683.9 |
| 3,594,441 | 7/1971 | Grebbell et al. | 260—683.15 |

FOREIGN PATENTS

| 1,146,274 | 3/1969 | Great Britain | 260—683.15 |
| 1,155,125 | 6/1969 | Great Britain | 260—683.15 |
| 1,155,657 | 6/1969 | Great Britain | 260—683.15 |

PAUL M. COUGHLAN, JR., Primary Examiner